Sept. 30, 1952 W. G. HOELSCHER 2,612,070
DISPLACEABLE BEARING FOR LATHE FEED SHAFTS
Filed Sept. 8, 1948 3 Sheets-Sheet 1

INVENTOR.
William G. Hoelscher
BY
Wood, Arey, Herron & Evans
ATTORNEYS

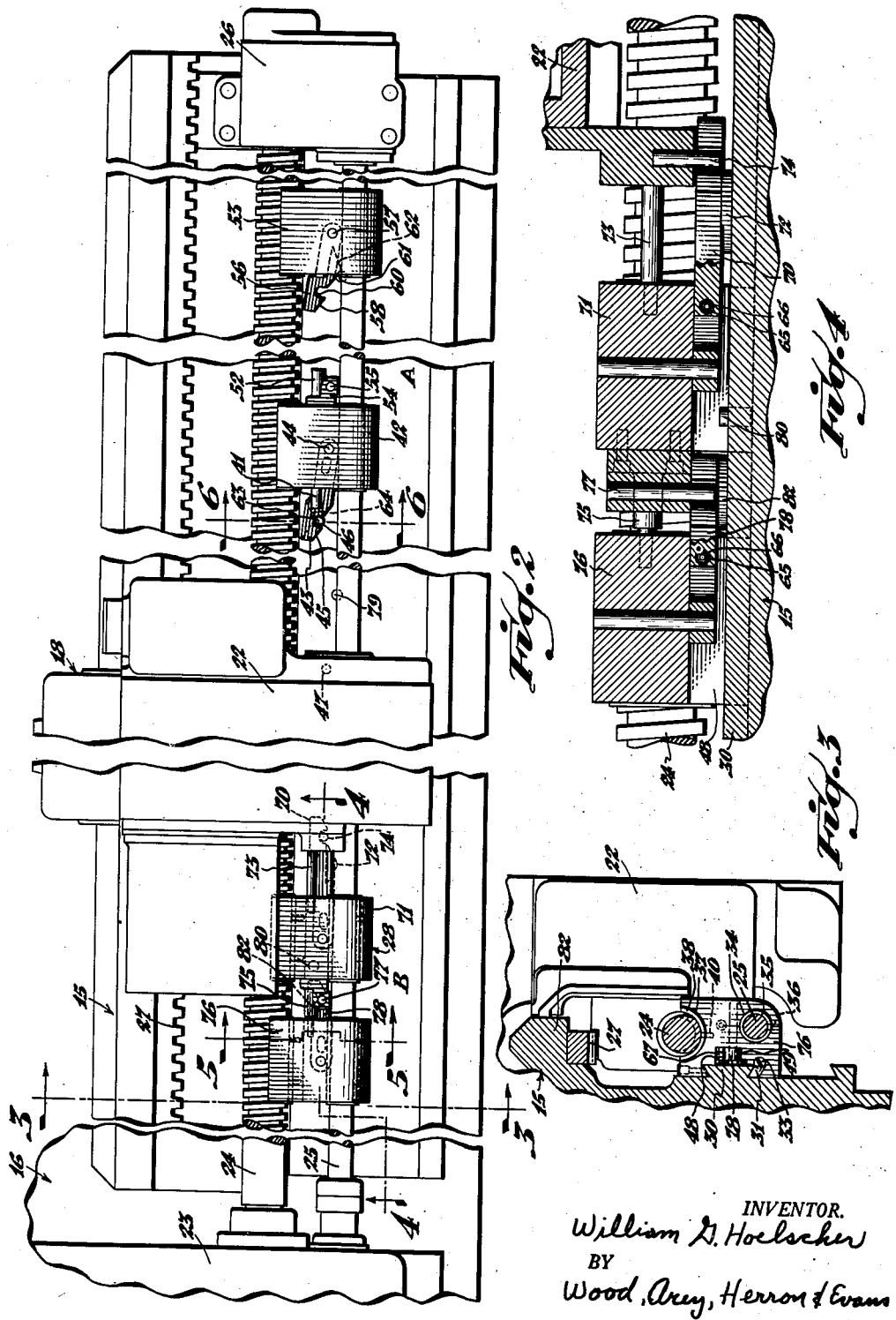

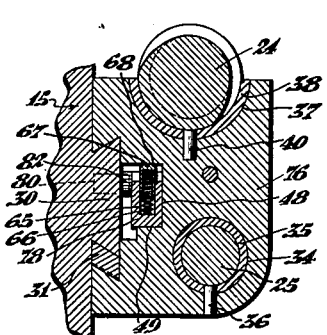

Patented Sept. 30, 1952

2,612,070

UNITED STATES PATENT OFFICE 2,612,070

DISPLACEABLE BEARING FOR LATHE FEED SHAFTS

William G. Hoelscher, Cincinnati, Ohio, assignor to The American Tool Works Company, Cincinnati, Ohio, a corporation of Ohio Application September 8, 1948, Serial No. 48,243

13 Claims. (Cl. 82—27)

This invention relates to machine tools, with particular reference to lathes which employ apron power shafts such as feed rods and lead screws to translate the carriage. More particularly, the invention is directed to an automatic mechanism for providing intermediate bearing supports for these shafts to prevent sag, without interfering with carriage translation.

The lathe, to which the present improvements are applied, follows the usual construction. In general, the structure embodies a bed having a headstock and tailstock at opposite ends, with a carriage slidably mounted upon the bed and translatable longitudinally relative to the headstock and tailstock. Following the general practice, the headstock includes a feed box having speed change gears in driving connection with a feed rod and lead screw. The ends of these shafts are journalled in the feed box and the shafts extend parallel with the bed. The opposite ends of the shafts are supported in a bearing unit at the tailstock end of the bed. The carriage is provided with an apron having suitable gearing slidably splined to the feed rod. The bed includes a rack, and the apron gear train meshes with this rack and traverses the carriage when the gear train is driven by the feed rod. The apron also includes a split nut engageable with the threads of the lead screw to translate the carriage by operation of the lead screw, for certain classes of work.

In the larger lathes, especially those built for handling long work pieces, it is necessary to provide a bed having sufficient length to accommodate the maximum size work piece. However, when the bed length exceeds certain limits, the lead screw and feed rod tend to sag since normally they are supported in bearings at opposite ends only. Since these shafts are in rotation during lathe operation, they tend to whip or rotate off center. This condition becomes more evident, due to centrifugal force, as the speed of rotation increases. The whipping effect of these shafts, of course, detracts generally from the performance of the lathe, causes excessive bearing wear and effects the accuracy of the work. It will be evident that it is impossible to provide intermediate fixed bearing supports for these shafts to eliminate sag because the carriage gear train is slidably splined to the feed rod and the split nut embraces the lead screw.

In general, it is the concept of the present invention to provide a series of slidable bearing blocks for the feed rod and lead screw, which are accurately guided by a rail formed on the bed of the lathe and which are located at opposite ends of the carriage so that one group is collectively swept ahead of the carriage as it is translated, and the blocks of the other group trail the carriage to be released individually at a series of predetermined support stations to eliminate sag and whip.

One of the principal objects of the invention has been to provide an automatic arrangement whereby several slidable bearing blocks are swept ahead collectively by the leading edge of the carriage as it traverses the bed, while the blocks at the trailing end are coupled together and to the carriage to be automatically released at predetermined shaft supporting stations. Thus, when the carriage is translated toward the tailstock end of the bed, the trailing blocks will be released at intermediate points between the carriage and the feed box bearing, to eliminate completely the normal tendency of the shafts to sag. Conversely, when the carriage is translated toward the headstock end of the bed, these spaced blocks will be engaged by the leading end of the carriage and pushed collectively toward the headstock, while the blocks at the opposite end of the carriage will trail the carriage and be released automatically at selected intermediate stations so that the shafts are supported at a series of points between the carriage and the tailstock bearing.

A further object has been to provide a simple and efficient automatic latching or coupling arrangement by means of which the blocks are latched together and to the carriage when the leading end of the carriage pushes them together so that the blocks are released successively at selected points when the carriage is traversed in the opposite direction.

An additional object has been to provide an arrangement of slidable support blocks which is exceptionally simple in structure, permitting the use of a greater or lesser number of blocks as determined by the length of the bed, and to provide a guide rail for supporting the blocks, which is formed at the front of the bed beneath the overhanging carriage ways so that the carriage ways protects the bearing blocks and guide rail from chips and dirt.

Further objects and features of the invention will be more fully apparent from the following detailed description with reference to the accompanying drawings which disclose a preferred embodiment of the invention.

In the drawings:

Figure 2 is an enlarged fragmentary side elevation of the lathe bed, carriage and associated parts illustrating the support blocks in operating position at the right hand side of the carriage, with the blocks on the opposite side pushed together by the leading edge of the carriage.

Figure 3 is a fragmentary sectional view taken on line 3—3, Figure 2, illustrating the support rail of the bed with a slide block engaged thereon in supporting position with reference to the lead screw and feed rod.

Figure 4 is a fragmentary longitudinal sectional view taken on line 4—4, Figure 2, illustrating the slide blocks and the latching apparatus which serves to latch the blocks together and to the carriage in the position illustrated in Figure 2.

Figure 5 is an enlarged fragmentary sectional view taken on line 5—5, Figure 2, further detailing the support rail and slide block details.

Figure 6 is a sectional view similar to Figure 5 taken on line 6—6, Figure 2, illustrating one of the release pins of the bed which releases the block at a selected position along the lathe bed.

Figure 7 is a sectional view taken on line 7—7, Figure 6, further detailing the structure and arrangement of the latch arms and release pins which position the support blocks.

Figure 8 is a sectional view taken on line 8—8, Figure 6, detailing one of the adjustment gibs of the support block to establish the proper sliding fit with the support rail.

Figure 9 is a sectional view taken on line 9—9, Figure 6, further detailing the gib plate structure.

Figure 10 is a diagrammatic side view of a lathe bed illustrating the general structure and operation of the support blocks as the carriage is translated with reference to the bed.

Figure 1:
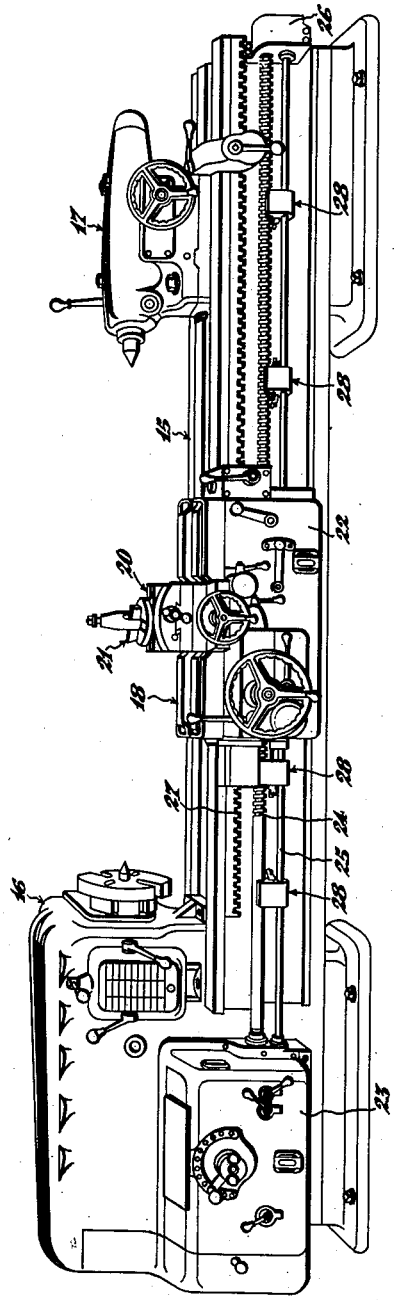
Figure 1 is a general side elevation of a lathe equipped with the lead screw and feed rod support blocks of the present invention.

The improved support block arrangement is shown as applied to a lathe in Figure 1. In general, the lathe constitutes a bed 15, a head stock 16 and a tail stock 17. A carriage 18 is slidably mounted on the bed and provides a tool slide 20 which carries the cutting tool 21. The carriage includes an apron 22 which depends downwardly at the front of the lathe and which includes the driving mechanism and control levers by means of which the carriage is translated relative to the bed.

A feed box 23 forms a part of the head 16 and drives a lead screw 24 and a feed rod 25 which extends alongside the lathe bed. A bearing unit 26 is provided at the tailstock end of the bed to provide a bearing support for the opposite ends of the lead screw and feed rod. The feed box is provided with suitable gearing and control levers to permit adjustment of lead screw and feed rod speeds. The apron 22 includes a gear train which is driven by the feed rod 25 and which includes a pinion meshing with the feed rack 27 mounted on the bed to cause longitudinal traverse of the carriage when the carriage control lever is swung to its operating position. The apron also is provided with a split nut engageable with the lead screw 24 by means of a control lever so that the carriage may be translated by the screw for certain classes of work.

In the present disclosure, the lathe is equipped with a set of four slidable bearing blocks indicated generally at 28, although a greater or lesser number of blocks may be installed utilizing the same structure and arrangement as disclosed. As shown in Figure 1, the support blocks are arranged in pairs on opposite sides of the carriage.

The bed includes release pins as hereinafter described by means of which the position of the blocks is regulated. These pins preferably are spaced such that the blocks are disposed in spaced relationship when the carriage is at either limit of travel on the bed. When the carriage is translated to the left, as shown in Figure 10, it will of course push the left hand blocks ahead of it in grouped formation. The carriage and blocks are provided with latching devices so that the blocks are hooked or coupled together and to the carriage and trail the carriage when it is translated to the right, as indicated by the arrow in Figure 10. The trailing blocks will be released at their designated release stations as the carriage is translated in the right hand direction and conversely, the right hand blocks will be pushed ahead by the leading edge of the carriage when the carriage contacts the blocks. Thus, the feed rod and lead screw at all times are supported at a series of predetermined points without regard to the position of the carriage.

Described in detail with reference to Figures 2, 3 and 5, the support blocks 28 are slidably supported by a dove-tail slide way 30 formed in the forward side wall of the lathe bed. A gib plate 31 (Figures 6, 8 and 9) is inserted between the lower surface of the support rail 30 and the support blocks 28. The gib plate 31 is tapered longitudinally and is adjustable by means of a machine screw 32 screwthreaded into the block 28 and having its head 33 engaged in a notch formed in the gib plate 31. This structure permits the block 28 to be closely adjusted to establish a precision sliding fit with the rail 30. The slide block is provided with a bore 34 (Figure 5) having a bearing bushing 35 secured therein by means of a pin 36. Bushing 35 provides a bearing to support the feed rod 25, the support block of course being slidable relative to the rod. The upper surface of the support block is provided with a semi-circular groove 37 having a liner 38 secured therein by means of a pin 40. Lead screw 24 rests upon and is supported by the liner 28. It will be apparent, therefore, that each support block 28 is slidable upon the rail 30 to provide a movable bearing for the lead screw and feed rod. By reason of the rail 30, each block is accurately positioned with respect to the true center of the feed rod and lead screw. To the extent above described, all of the support blocks of the set are substantial duplicates, although the latching mechanism of the respective blocks differs somewhat, as hereinafter described.

As shown in Figure 2, the blocks 28 are arranged in groups or pairs on opposite sides of the carriage. As shown, the right hand group of blocks is indicated at A and the left hand group at B. These groups of blocks are duplicates of each other except that the right hand group A is symmetrically opposite to the left hand group B. The block of each group, which is adjacent the carriage, is provided with an abutment rod 41 and 73 respectively, each of which extends from the face of the block toward the apron 22. The rods 41 establish contact with the carriage apron when the carriage is translated toward the block to space the block properly from the apron for engagement with a latch pin mounted in the apron as hereinafter described.

As shown in Figure 2, the leading block 42 of group A is provided with a latch arm 43 pivotally mounted upon a pin 44 pressed into the block 42. The swinging end of latch arm 43 is provided with a latching skid surface 45 and includes a notch 46 arranged to engage a latch pin 47 pressed into the apron 22 at its inner surface. As shown in Figures 5, 6 and 7, each slide block is provided with a recess 48 to receive the latch arm and to provide a shoulder 49 to sustain the latch arm at a normal vertical plane suitable to cause the leading end of skid 45 to engage the latch pin 47 and elevate the latch arm the same time that the carriage moves into engagement with the abutment rod 41. It will be noted at this point that the abutment rod 41 provides the necessary spacing between the block and carriage to establish engagement between pin 47 and notch 46 of the latch arm. It will be apparent also, that after engagement of latch arm 43, block 42 will trail the carriage when it is translated to the left, as viewed in Figure 2, until the latch is released.

As shown in Figure 2, the right hand side of block 42 includes an abutment rod 52 similar to abutment rod 41, which serves to space block 42 with reference to its mating block 53. Block 42 further includes a lug 54 having a latch pin 55 for engagement by a latch arm 56 which is pivoted on a pin 57, pressed into block 53, and which includes a notch 60 similar to arm 43. During right hand translation of the carriage, spacer rod 41 first contacts the apron, then spacer rod 52 contacts block 53 and the latching skid portion 58 of latch arm 56 engages the pin 55 and elevates the arm for engagement of its notch 60 with latch pin 55. When the carriage again is translated to the left, therefore, block 41 is connected to the carriage by latch pin 47 and block 53 is connected to block 41 by latch pin 55. The blocks therefore will trail the carriage until the latch arm 56 of block 53 encounters a release pin 61 which is secured to the carriage (Figures 2 and 7). Latch arm 56 includes a laterally projecting trip cam or skid 62 engageable with pin 61 as shown in Figure 7. Upon engagement with the pin, the latch arm is elevated to release the block 53 which stops at this point.

Block 42 remains attached to the carriage until it encounters a second release pin 63 which is located at a plane above release pin 61. For this purpose latch arm 43 includes a laterally extending trip cam or skid 64 similar to skid 62, spaced immediately above the notch 45. When the latch arm is elevated by release pin 63 to the position shown in Figure 7, it releases its engagement with latch pin 47 and stops, this being the location for the block 42.

As shown in Figure 5, the latch arm for each block 28 is provided with a bore 65 in which is disposed a compression spring 66. A thimble or plunger 67 extends into bore 65 enclosing the upper end of spring 66. The upper end of plunger 67 is in contact with the top shoulder 68 of recess 48. Thus, the spring exerts a constant downward pressure against the latch arms to insure engagement with their respective pick up pins.

From the foregoing, it will be apparent that the support blocks of group A will be pushed ahead collectively by the carriage as the carriage is translated to the right. When the carriage returns to the left, the latch arms 43 and 56 will secure the blocks to each other and to the carriage, and the blocks trail the carriage until released individually. The release pins 61 and 63 are disposed at different elevations and the respective release skids 62 and 64 are located at elevations correlated to the pins to establish a keyed relationship with these pins. Thus, skid 64 for support block 42, is located at a higher elevation than skid 62 so that skid 64 passes above pin 61. When skid 62 encounters pin 61, block 53 is unlatched from block 42, while block 42 remains latched to the carriage. Upon encountering the release pin 63, which is located to the left of pin 61, block 42 is unlatched from the carriage and remains stationary in spaced relationship with block 53. Continued movement of the carriage to the left causes the carriage to push the first block of pair B to the left to establish a latching engagement between this block and the carriage in the same manner as described with reference to the blocks of group B.

As shown in Figures 2 and 4, the support blocks of group B are substantially the same as those of group A except for minor variations in the arrangement of the latch arms and release pins. As shown, the latch arm 70 for the right hand block 71 of group B is somewhat longer than those previously described. It will further be noted that release skid 72 is located at the same elevation as skid 62 of block 53. The block 71 is provided with an abutment or spacer rod 73 extending toward the carriage to space the block for proper engagement of the latch arm 70 with the latch pin 74 secured to the carriage. The opposite side of block 71 includes a spacer rod 75 for engagement with block 76. Immediately below the rod is located a latch pin 77 for engagement by the latch arm 78 of block 76 so that the two blocks are connected together and to the carriage when the carriage is translated to the left. The lathe bed is provided with release pins 79 and 80 disposed at proper elevations to key with the respective release skids 72 and 82 of latch arms 70 and 78. The blocks of group B operate in the same manner as previously described with reference to the blocks of group A.

It will be observed from the foregoing that the operation of the support block arrangement is entirely automatic and requires no attention on the part of the operator. Although disclosed with reference to a lathe which utilizes a set of four blocks, it will be apparent that a greater or lesser number of blocks may be employed according to the length requirements of the machine. If additional blocks are utilized, it is necessary merely to add additional release pins, together with blocks having latch arms properly correlated to the pins. The arrangement may be applied to machines other than the specific structure disclosed which include horizontal shafts requiring intermediate bearing supports. Also, the blocks may readily be modified to include bores for a greater number of shafts as required, without substantial change in design.

As shown in Figure 3, the forward carriage guide way 82 at the top of the bed overhangs considerably the dovetail slideway 30 formed in the forward wall of the bed. Thus, the guide way 82 serves the dual function of supporting the carriage and preventing chips and particles from dropping on the bearing blocks 28 and slideway 30. This improves performance since accumulations of particles would interfere with proper functioning of the latching mechanism and would cause the slideway 30 to wear unduly.

Having described my invention, I claim:

1. In a machine tool having a bed, a carriage translatable relative to the bed and feed shafts extending along the bed, an apparatus for providing an intermediate bearing support for said feed shafts comprising; a bearing block, a rail on said bed, said rail extending longitudinally in parallelism with the feed shafts and engaging said bearing block to provide a longitudinally slidable and transversely rigid bearing connection between the bed and bearing block, said block having respective bearings for supporting said feed shafts, said block being adapted to be shifted by the leading end of the carriage as the carriage is translated toward said block, means for coupling the bearing block to the carriage when the carriage contacts the block whereby the block trails the carriage when the carriage is translated in the opposite direction, and trip means on said bed operable to trip said coupling means to release the block when said trip means encounters said coupling means as the carriage is translated in said opposite direction.

2. In a lathe having a bed, a carriage slidably mounted on said bed, a feed and a lead screw shaft extending along said bed and having bearings at the opposite ends of said bed to support said shafts, mechanism for providing intermediate bearing supports for said feed and lead screw shafts comprising; a slidable bearing block having bearings in slidable engagement with said feed and lead screw shafts, a slide rail mounted rigidly on the bed and extending longitudinally in parallelism with the feed and lead screw shafts, said slide rail engaging the bearing block and providing a longitudinally slidable and transversely rigid bearing connection between the bed and said bearing block, a latching device on said block, cooperating latching means on said carriage for coupling the block to said carriage when the carriage is translated toward said block, and release means on said bed operable to release said latching means when the carriage is translated in the opposite direction with said block coupled to the carriage to station said bearing block at an intermediate position along said shafts.

3. In a lathe having a bed, a carriage translatably mounted upon said bed and power shafts extending along said bed, support means for providing intermediate bearing supports for said power shafts comprising; a plurality of slidable bearing blocks, said blocks having bearings to provide supports for said power shafts, a rail on said lathe bed, said rail extending longitudinally in parallelism with said power shafts and engaging the bearing blocks to provide a longitudinally slidable and transversely rigid bearing connection between the bed and bearing blocks, said blocks being disposed in groups at opposite ends of the carriage and adapted to be engaged by the leading end of the carriage when the same is translated, latching means on said blocks and on opposite ends of the carriage adapted to couple the blocks of a group together and to the carriage when the several blocks are engaged collectively by the leading end of the carriage as the same is translated, release means secured to the lathe bed and cooperating with said latching means and adapted selectively to engage said latching means to release said blocks individually when said carriage is translated in the opposite direction with the blocks in coupled relationship at the trailing end of the carriage.

4. In a lathe having a bed, a carriage translatably mounted upon said bed and a power shaft extending along said bed, support means for providing intermediate bearing supports for said shaft comprising; a plurality of slidable bearing blocks, said blocks having a bore to provide a bearing support for said shaft, a slide way mounted rigidly on the bed and extending longitudinally in parallelism with said power shaft, said slide way engaging the bearing blocks and providing a longitudinally slidable and transversely rigid bearing connection between the bed and said bearing blocks thereby providing a rigid bearing support for the power shaft, said blocks being disposed in groups at opposite ends of the carriage and adapted to be engaged by the leading end of the carriage when the same is translated, latching means on said blocks and on said carriage adapted to couple the blocks of a group together and to the carriage when the several blocks are engaged collectively by the leading end of the carriage, and trip means secured to the lathe bed and arranged to selectively disengage said blocks individually when said carriage is translated in the opposite direction with the blocks in coupled relationship at the trailing end of the carriage.

5. In a lathe having a bed, a carriage slidably mounted on said bed, a feed and a lead screw shaft extending along said bed and having bearings at the opposite ends of said bed to support said shafts, mechanism for providing intermediate bearing supports for said feed and lead screw shafts comprising; a plurality of slidable bearing blocks having bearings in slidable engagement with said feed and lead screw shafts, a slide rail mounted rigidly on the bed and extending longitudinally in parallelism with the feed and lead screw shafts, said slide rail engaging the bearing blocks and providing a longitudinally slidable and transversely rigid bearing connection between the bed and said bearing blocks, a respective latch device on each of said blocks, cooperating latching means on said carriage for coupling the blocks to said carriage when the carriage is translated toward said blocks, respective release devices on said latching devices, cooperating release means on said bed operable to release said latching devices when the carriage is translated in the opposite direction with said blocks coupled to the carriage to station said bearing blocks at intermediate positions along said shafts.

6. In a lathe having a bed, a carriage translatably mounted upon said bed and power shafts extending along said bed, support means for providing intermediate supports for said power shafts comprising; a plurality of slidable bearing blocks, said blocks having bores to provide bearing supports for said power shafts, a rail on said lathe bed for slidably supporting the blocks, said blocks being disposed in groups at opposite ends of the carriage and adapted to be engaged by the leading end of the carriage when the same is translated, a latch arm on each of said blocks, cooperating latch pins on the blocks and carriage adapted to couple the blocks of a group together and to the carriage when the several blocks are engaged collectively by the leading end of the carriage as the same is translated, trip pins secured to the lathe bed, said pins arranged to selectively engage said latch arms to release said blocks individually relative to each other and to said carriage when the carriage is translated in the opposite direction with the blocks in coupled relationship at the trailing end of the carriage.

7. In a lathe having a bed, a carriage slidably mounted on the bed, power shafts extended along the bed and in slidable driving connection with the carriage for driving the same, a bearing support mechanism adapted to provide intermediate bearings for said power shafts comprising; a plurality of slide blocks arranged in groups at opposite ends of the carriage, a slide rail on said bed to provide a slidable support for said blocks, said blocks having means to provide slidable bearing supports for said shafts, respective latch arms on said blocks, a latch pin at each opposite end of said carriage engageable by the latch arm of the block of each group adjacent the carriage, a latch pin on said block engageable by the latch arm of the next adjacent block, a series of release pins disposed at spaced intervals along the lathe bed, each of said pins being correlated to the respective latch arms to cause said blocks to be released individually at spaced intervals to provide a plurality of spaced bearing supports for said power shafts.

8. In a lathe having a bed, a carriage slidably mounted on the bed, power shafts extended along the bed and in slidable driving connection with the carriage for driving the same, a bearing support mechanism adapted to provide intermediate bearings for said power shafts comprising; a plurality of slide blocks arranged in groups at opposite ends of the carriage, a slide rail on said bed to provide a slidable support for said blocks, said blocks having bearings to provide slidable supports for said shaft, respective latch arms on said blocks, a latch pin at each opposite end of said carriage engageable by the latch arm of the block of each group adjacent the carriage, a latch pin on said block engageable by the latch arm of the next adjacent block, respective release skids on said latch arms, each of said skids being disposed at a different elevation, a series of release pins disposed at spaced intervals along the lathe bed, each of said pins being disposed in a different elevation correlated to the respective elevations of the release skids to cause said blocks to be released individually at spaced intervals to provide a plurality of spaced bearing supports for said power shafts.

9. In a lathe having a bed, a carriage slidably mounted on the bed, power shafts extended along the bed and in slidable driving connection with the carriage for driving the same, a bearing support mechanism adapted to provide intermediate bearings for said power shaft comprising; a plurality of slide blocks arranged in pairs on opposite sides of the carriage, a slide rail on said bed to provide a slidable support for said blocks, said blocks being arranged to provide slidable bearing supports for said shaft, respective latch arms on said blocks, each of said arms having a skid engageable with said pins to establish a coupling engagement therewith, a latch pin at each opposite side of said carriage engageable by the latch arm of the block adjacent the carriage, a latch pin on said block engageable by the latch arm of the next adjacent block, each of said latch arms having a latch skid automatically engageable with said pins to establish a coupling engagement therewith, respective release skids on said latch arms, a series of release pins disposed at spaced intervals along the lathe bed, each of said pins being correlated to a respective release skid to cause said blocks to be released individually at the several stations to provide a plurality of spaced bearing supports for said power shaft.

10. In a lathe having a bed, a carriage slidably mounted upon the bed, a feed rod and a lead screw disposed along the bed, an apparatus for providing intermediate bearing supports for the feed rod and lead screw comprising; a plurality of slidable bearing blocks having bores in bearing engagement with said feed rod and having an open recess to cradle said lead screw, said blocks being disposed at opposite ends of the carriage and adapted to be engaged by the carriage and advanced ahead of the carriage as the same is translated, a guide rail on the bed substantially coextensive therewith arranged to slidably support the bearing blocks for movement in parallelism with the feed rod and lead screw and in bearing engagement therewith, coupling means on said blocks adapted to couple the same to one another and to the carriage when the blocks are contacted by the leading end of the carriage and grouped together, and release means mounted on the bed operable to actuate the coupling means to release said blocks individually at spaced intervals along the bed as the carriage is translated in the opposite direction to provide bearing supports for the feed rod and lead screw.

11. In a lathe having a bed, a carriage slidably mounted on the bed, power shafts extended along the bed and in slidable driving connection with the carriage for driving the same, a bearing support mechanism adapted to provide intermediate bearings for said power shafts comprising; a plurality of slide blocks arranged in pairs on opposite ends of the carriage, a slide rail on said bed to provide a slidable support for said blocks, said blocks having bearings to provide slidable supports for said power shafts, respective latch arms on said blocks, a latch pin at each opposite end of said carriage engageable by the latch arm of the block of each pair adjacent the carriage, a latch pin on said block engageable by the latch arm of the next adjacent block, each of said latch arms including a notch engageable with said latch pin, respective release skids on said latch arms, each of said skids being disposed at a different elevation, a series of release pins disposed at spaced intervals along the lathe bed, each of said pins being disposed in a different elevation correlated to the respective elevations of the release skids and adapted to elevate skid latch arms to disengage said notches relative to said latch pins to cause said blocks to be released individually at the several stations to provide a plurality of spaced bearing supports for said power shaft.

12. In a lathe having a bed, a carriage translatably mounted upon said bed and a shaft extending along said bed, support means for providing intermediate bearing supports for said shaft comprising; a slidable bearing block, said block having a bore to provide a bearing support for said shaft, means on said lathe bed for slidably supporting the block, said block being adapted to be engaged by the leading end of the carriage when the same is translated, a latch arm on said block, a latch pin on said carriage adapted to engage said arm to couple the block to the carriage when the block is engaged by the leading edge of the carriage, said latch arm having a laterally extending release skid, and a release pin secured to the lathe bed and arranged to engage said release skid to release said latch arm when said carriage is translated in the opposite direction with the block in coupled relationship at the trailing end of the carriage to station said block at said release pin.

13. In a lathe, a bed, a translatable carriage, carriage guide ways at the top of the bed for slidably supporting the carriage, a feed rod and lead screw disposed along the bed, a plurality of slidable bearing blocks in bearing engagement with said feed rod and lead screw, a guide rail for slidably supporting said blocks, said guide rail being formed in the front of the bed beneath one of said carriage guide ways, said guide way arranged to overhang said guide rail to protect the same from chips and particles said bearing blocks being disposed at opposite ends of the carriage and adapted to be contacted and advanced by the carriage as the same is translated, coupling means on said blocks adapted to couple the blocks to one another and to the carriage when the blocks are contacted by the leading end of the carriage and grouped together, and release means mounted on the bed operable to actuate the coupling means to release said blocks individually at spaced intervals along the bed as the carriage is translated in the opposite direction and thereby provide spaced bearings for the feed rod and lead screw.

WILLIAM G. HOELSCHER.

REFERENCES CITED

The following references are of record in the file of this patent:

UNITED STATES PATENTS

| Number | Name | Date |
|---|---|---|
| 2,354,372 | Groene | July 25, 1944 |

FOREIGN PATENTS

| Number | Country | Date |
|---|---|---|
| 196,437 | Great Britain | Apr. 26, 1923 |